(12) United States Patent
Borley et al.

(10) Patent No.: US 9,853,925 B2
(45) Date of Patent: *Dec. 26, 2017

(54) AUTOMATIC TRANSFORMATION OF MESSAGES BETWEEN SERVICE VERSIONS

(71) Applicant: International Business Machines Corporation, Armonk, NY (US)

(72) Inventors: Andrew J. Borley, Blandford Forum (GB); Callum P. Jackson, Romsey (GB); Philip L. Norton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,913

(22) Filed: Jul. 18, 2016

(65) Prior Publication Data

US 2016/0330153 A1    Nov. 10, 2016

Related U.S. Application Data

(63) Continuation of application No. 14/729,155, filed on Jun. 3, 2015, now Pat. No. 9,426,047.

(30) Foreign Application Priority Data

Jun. 13, 2014   (GB) .................................. 1410560.5

(51) Int. Cl.
   *G06F 9/44*       (2006.01)
   *H04L 12/58*      (2006.01)
   (Continued)

(52) U.S. Cl.
   CPC ............. *H04L 51/06* (2013.01); *G06F 8/71* (2013.01); *H04L 43/0805* (2013.01); *H04L 67/2823* (2013.01); *H04L 69/08* (2013.01)

(58) Field of Classification Search
   None
   See application file for complete search history.

(56) References Cited

U.S. PATENT DOCUMENTS

6,298,478 B1 * 10/2001 Nally ...................... G06F 9/466
                                                     717/170
7,493,415 B2    2/2009 Phippen et al.
(Continued)

FOREIGN PATENT DOCUMENTS

| GB | 2362969 A | 5/2001 |
| GB | 2527118 A | 12/2015 |
| WO | 2012006628 A2 | 1/2012 |

OTHER PUBLICATIONS

Tost et al., "Building a Service Visioning Gateway with WebSphere ESB and WebSphere Service Registry and Repository V7.5" IBM Redpaper, Sep. 28, 2011, pp. 1-38.
(Continued)

*Primary Examiner* — Chameli Das
(74) *Attorney, Agent, or Firm* — Michael A. Petrocelli

(57) ABSTRACT

A method and system are provided for automatic transformation of messages between service versions. The method includes collecting message data of messages sent to two or more versions of a service. Message data is identified as relating to a version of a service. Relationships are inferred between structure and content of messages sent to different versions of a service, and message transformation rules are created based on the inferred relationships.

17 Claims, 8 Drawing Sheets

(51) Int. Cl.
*H04L 12/26* (2006.01)
*H04L 29/08* (2006.01)
*H04L 29/06* (2006.01)

(56) References Cited

U.S. PATENT DOCUMENTS

| | | | |
|---|---|---|---|
| 7,509,431 | B2 | 3/2009 | Singhal et al. |
| 8,032,588 | B2 | 10/2011 | Fang et al. |
| 8,060,604 | B1 | 11/2011 | Breau et al. |
| 8,493,985 | B2 | 7/2013 | Beverly et al. |
| 9,015,660 | B1* | 4/2015 | Webb .................. G06F 8/38 709/224 |
| 2001/0049743 | A1 | 12/2001 | Phippen et al. |
| 2002/0120648 | A1 | 8/2002 | Ball et al. |
| 2005/0004978 | A1* | 1/2005 | Reed .................. G06Q 30/0601 709/203 |
| 2005/0216421 | A1* | 9/2005 | Barry .................. G06F 11/0709 705/64 |
| 2006/0004745 | A1 | 1/2006 | Kuhn et al. |
| 2006/0106941 | A1 | 5/2006 | Singhal et al. |
| 2006/0230124 | A1* | 10/2006 | Belfiore .................. G06F 9/54 709/219 |
| 2006/0285692 | A1 | 12/2006 | Kerstens et al. |
| 2007/0067373 | A1 | 3/2007 | Higgins et al. |
| 2008/0178169 | A1 | 7/2008 | Grossner et al. |
| 2008/0295088 | A1* | 11/2008 | Bhat .................. G06F 8/67 717/170 |
| 2008/0310312 | A1* | 12/2008 | Acharya .................. H04L 65/1076 370/241 |
| 2009/0313335 | A1* | 12/2009 | Heidasch .................. G06F 9/541 709/206 |
| 2009/0319651 | A1 | 12/2009 | Fang et al. |
| 2011/0061046 | A1 | 3/2011 | Phillips |
| 2011/0153756 | A1* | 6/2011 | Angle .................. H04L 12/5855 709/206 |
| 2014/0330799 | A1 | 11/2014 | White |
| 2014/0344394 | A1* | 11/2014 | Resch .................. G06F 11/1076 709/213 |
| 2014/0351798 | A1* | 11/2014 | Ross .................. G06F 9/4448 717/137 |
| 2015/0227521 | A1* | 8/2015 | Levari .................. G06F 17/30584 707/694 |
| 2015/0229538 | A1* | 8/2015 | Burke .................. H04L 47/76 709/225 |
| 2015/0365308 | A1 | 12/2015 | Borley et al. |
| 2016/0094962 | A1* | 3/2016 | Wilsher .................. H04L 12/287 455/466 |

OTHER PUBLICATIONS

Oracle, "Fusion Middleware Concepts and Architecture for Oracle Service Bus", Accessed on Mar. 10, 2015, pp. 1-10.
GB Search Report for GB Application No. GB1410560.5, dated Dec. 9, 2014, pp. 1-3.

* cited by examiner

AUTOMATIC TRANSFORMATION OF MESSAGES BETWEEN SERVICE VERSIONS

BACKGROUND

This invention relates to the field of automatic transformation of messages. In particular, the invention relates to automatic transformation of messages between service versions.

Service-oriented architecture (SOA) is a software architecture based on discrete, independent units of software providing application functionality as services to other applications. This provides flexibility and resilience in providing the functions of the services. SOA may include web services provided over standard Internet protocols.

When a new version of a service is introduced into a system there is typically a middleware development task required to allow continued support of original clients that were designed to create and send messages to earlier versions of the service. This development task is normally based around the idea of transforming the structure and contents of messages from original clients to match the structure and contents required by the new service.

To enable the development of this transformation, the developer must understand:
  a) the structure of both the original and new messages (often these are formally set using a schema);
  b) the meaning of the content and structure of both the original and new messages so that the transformed message has the same meaning to the new service as the original message would have had to the original service.

If this information is not available or is only partially known to the developer, the transformation created may not correctly transform messages for the new service when it is executed.

SUMMARY

Therefore, there is a need in the art to address the development task and to enable the development of the transformation of messages.

According to a first aspect of the present invention there is provided a method for automatic transformation of messages between service versions, comprising: collecting message data of messages sent to two or more versions of a service; identifying message data as relating to a version of a service; inferring relationships between structure and content of messages sent to different versions of a service; and creating message transformation rules based on the inferred relationships.

According to a second aspect of the present invention there is provided a system for automatic transformation of messages between service versions, comprising: a message collecting component for collecting message data of messages sent to two or more versions of a service; a service identifying component for identifying message data as relating to a version of a service; a message data interrogating component for inferring relationships between structure and content of messages sent to different versions of a service; and a transformation rule generator for creating message transformation rules based on the inferred relationships.

According to a third aspect of the present invention there is provided a computer program product for automatic transformation of messages between service versions, the computer program product comprising a computer-readable storage medium having computer-readable program code embodied therewith, the computer-readable program code configured to: collect message data of messages sent to two or more versions of a service; identify message data as relating to a version of a service; infer relationships between structure and content of messages sent to different versions of a service; and create message transformation rules based on the inferred relationships.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system automate the process of transformation development between versions of services and execution via analysis of sets of messages that are monitored using a proxy system. By collecting and analyzing data on large numbers of messages being sent to both an original service and a new version of a service, inferences can be made about how the structures and content of the two different message versions are related.

When sufficient message data is collected, the proxy system can be switched over to automatically transform the structure and contents of a message destined for the original service into the structure and contents that are required for the new service version. The transformed message can then be sent on to the new service. This allows the original service to be phased out, while still supporting original clients and without requiring the development of a transformation.

Figure 1:
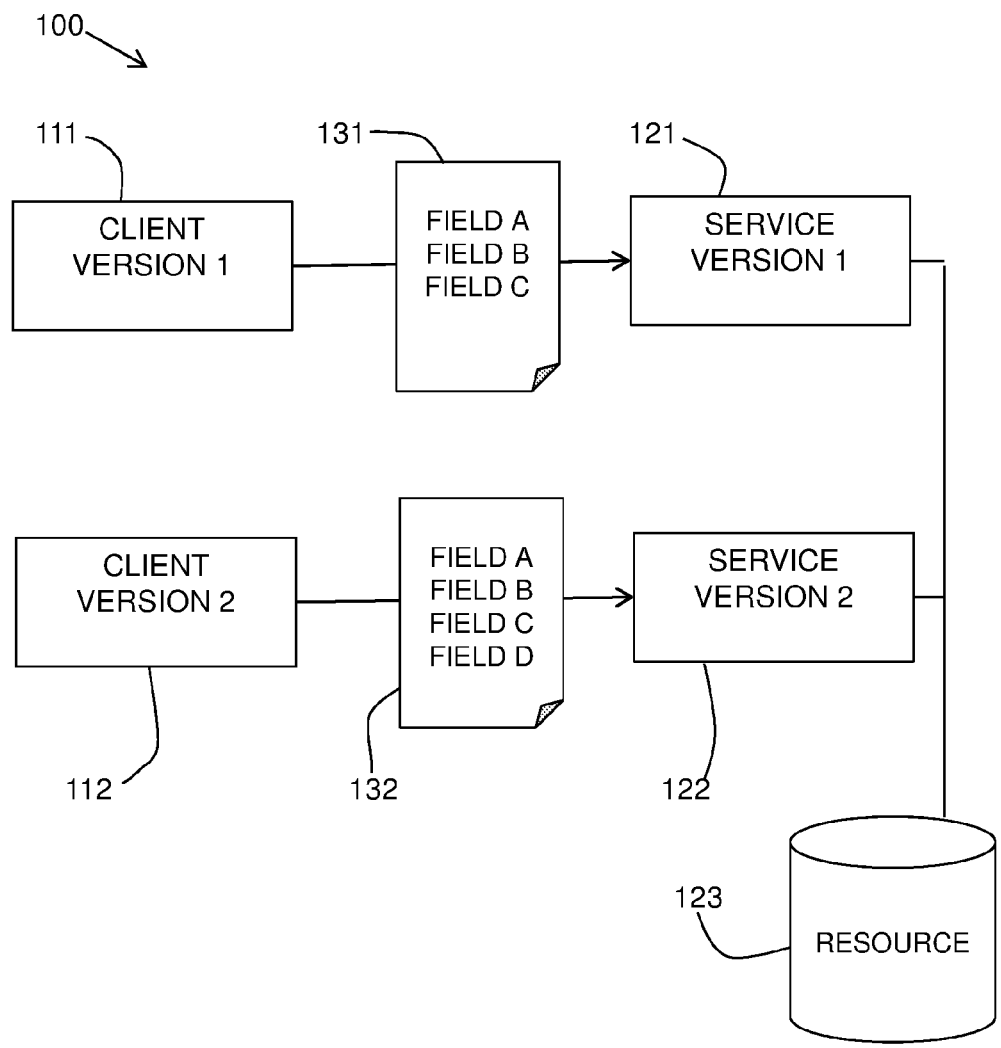
FIG. 1 is a schematic diagram of a service architecture of the field of the present invention.

Referring to FIG. 1, a schematic diagram 100 illustrates the addressed problem. A first service version 121 may be provided, for example, accessing a resource 123. The first service version 121 may receive messages 131 from a first client version 111.

The service may be upgraded to a second service version 122, for example, accessing the same resource 123. The second service version 122 may receive messages 132 from a second client version 112 of a different format to the messages 131 from the first client version 111.

In the illustrated scenario, the message 131 from the first client version 111 has fields A, B, C and the message 132 from the second client version 112 has an additional field D. Data collection and analysis relating to the messages 131, 132 and the versions of the service 121, 122 they are sent to is used to generate an automated message transformation for messages 131 of an older version of a service 121 to a message format according to a newer version of the service 122.

Figure 2:
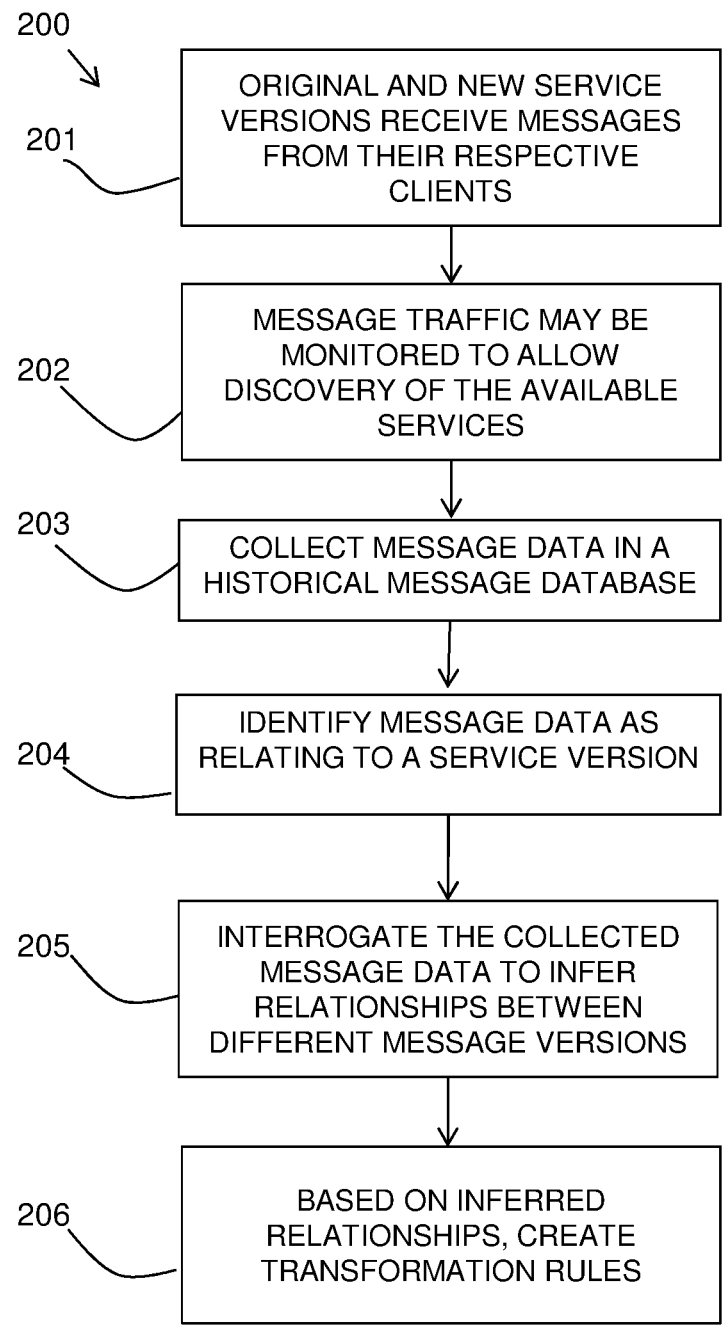
FIG. 2 is a flow diagram of an embodiment of a first aspect of a method in accordance with the present invention.
Figure 3:
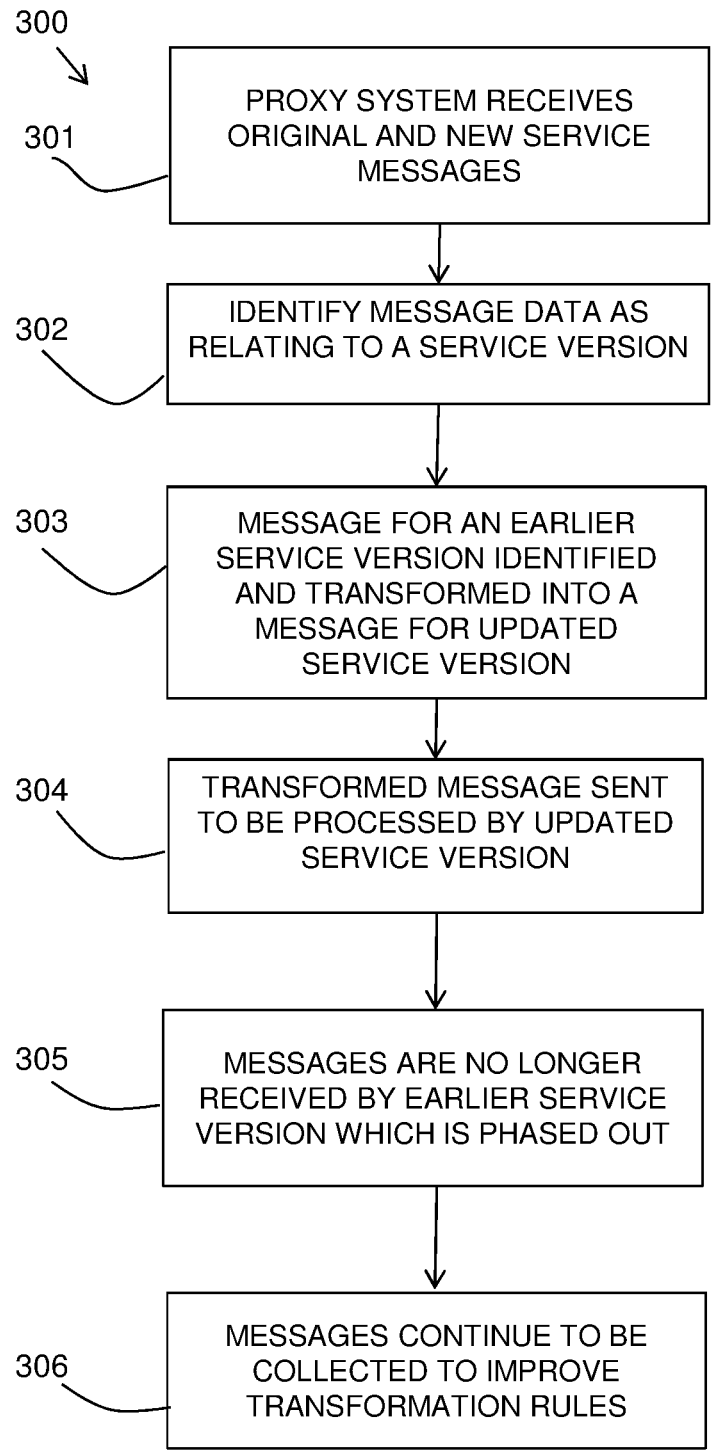
FIG. 3 is a flow diagram of an embodiment of a second aspect of a method in accordance with the present invention.
Figure 4:
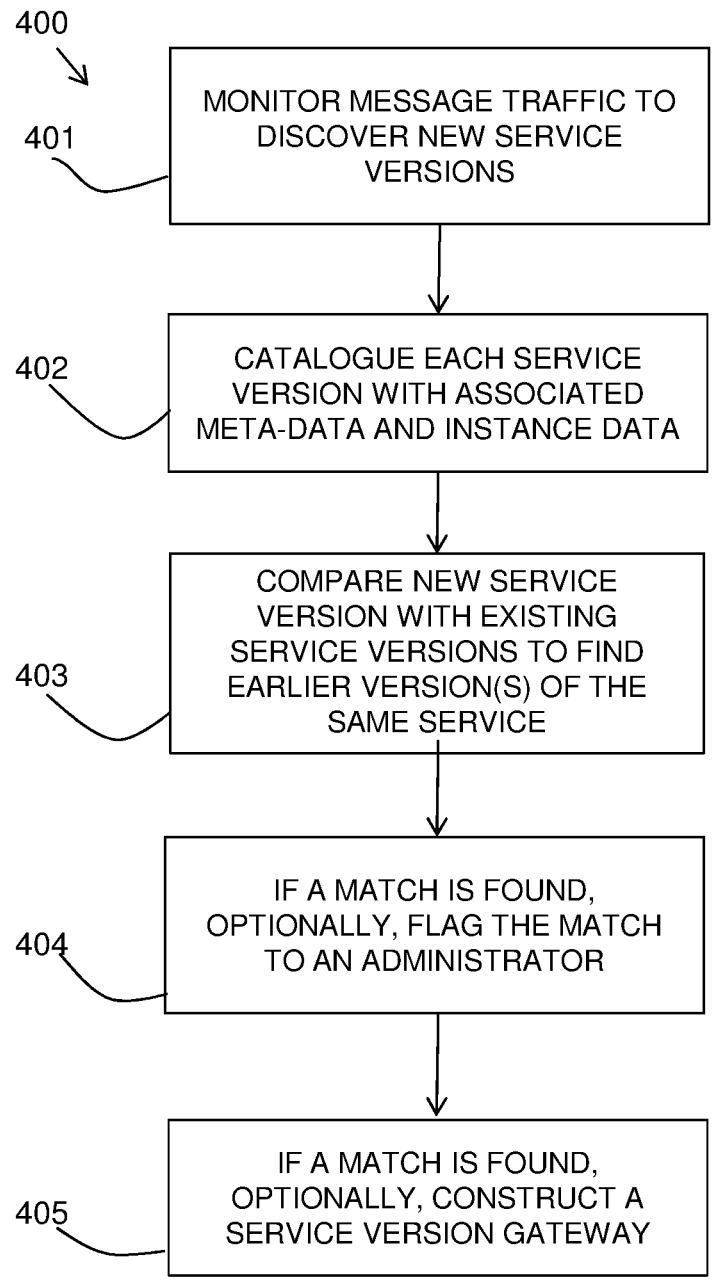
FIG. 4 is a flow diagram of an embodiment of a third aspect of a method in accordance with the present invention.

The described method may be split into different phases: a data collection phase; a transformation phase; and a background service version matching phase. FIGS. 2, 3 and 4 show flow diagrams 200, 300, 400 of example methods of these two phases.

Referring to FIG. 2, the flow diagram 200 shows an embodiment of the data collection phase.

Original and new service versions may receive 201 messages from their respective clients. The message traffic may be monitored 202 to allow discovery of the services and versions of the services available. For example, network traffic may be monitored to allow discovery of services available on the network.

A proxy system may invisibly collect 203 the message data in a historical message database. The message data may be identified 204 as relating to a service version as catalogued with associated meta-data and examples of instance data. In one embodiment, the message data may be identified as relating to a service version based on the uniform resource locator (URL) of the service that the message is being dispatched to, for example, http://myserver/myservice/version1 and http://myserver/myservice/version2.

An analytics engine may interrogate 205 the collected message data to infer relationships between the different messages destined for different versions of a service.

Based on the inferred relationships, a set of transformation rules may be created 206 and stored. A transformation rule or set of transformation rules may transform a message format for an earlier version of a service to a message format for a later version of the service.

For example, messages for an updated service version may have additional data fields compared to messages for the earlier service version and the content for the additional fields may be deduced based on the contents of other fields that exist in messages for the earlier service version.

The described method includes the ability to generate portType level transformations and is not limited to service messages using the same portType providing a dynamic, adaptable system.

Referring to FIG. 3, the flow diagram 300 shows an embodiment of the transformation phase. When the analytics engine has enough confidence in the inferred relationships and the generated transformation rules, the system may be switched to the transformation phase.

The proxy system receives 301 both new and original messages. A service version to which a message is originally being sent is identified 302. This may be carried out in a similar manner to step 204 in FIG. 2.

A message for an earlier service version is identified 303 and transformed using the generated transformation rules into a message for the later, updated service version.

The transformed message now has the structure and content required by the later, updated service version and is sent 304 on to be processed by the later, updated service version.

Messages are no longer received 305 by the earlier service version, which can be phased out.

Messages from clients for the updated service versions may continue to be collected 306 and analyzed to help improve the transformation rules.

Additional processing may be provided for error handling. If the transformation rules do not correctly transform a message and an error is raised by the system or the updated service version, the system may go back to the message collection, relationship infernal and rules generation phase, as the transformation rules may not be complete. The earlier service version may not be fully phased out until any error correction has been carried out.

Referring to FIG. 4, the flow diagram 400 shows an embodiment of the background service version matching phase.

The described method may monitor 401 the message traffic, to allow the discovery of the services and versions available in the system or network. The service versions may be catalogued 402 with associated meta-data and examples of instance data. This may also mean attempting to collect a Web Service Definition Language (WSDL) file.

On discovery of a new service version, a process of comparison 403 with existing service versions may start in the background using the cataloged meta-data and examples of instance data. The aim being to find a match for the new service version with one or more earlier version(s) of the same service.

A service message comparison is illustrated below:
Service B message is almost the same as a service A message but uses differing namespaces in Extensible Markup Language (XML).
Service B message is almost the same as a service A message, but has an extra field with a fixed value.
Service B message is almost the same as a service A message, but one of the fixed field values has been updated to a new fixed value.
Service B message is almost the same as a service A message, but fields are in a different order.

If a match is found, the method may flag 404 the identification of a match of a new service version to an earlier service version to an administrator of the system and/or may automatically construct 405 a service version conversion gateway.

Figure 5A:
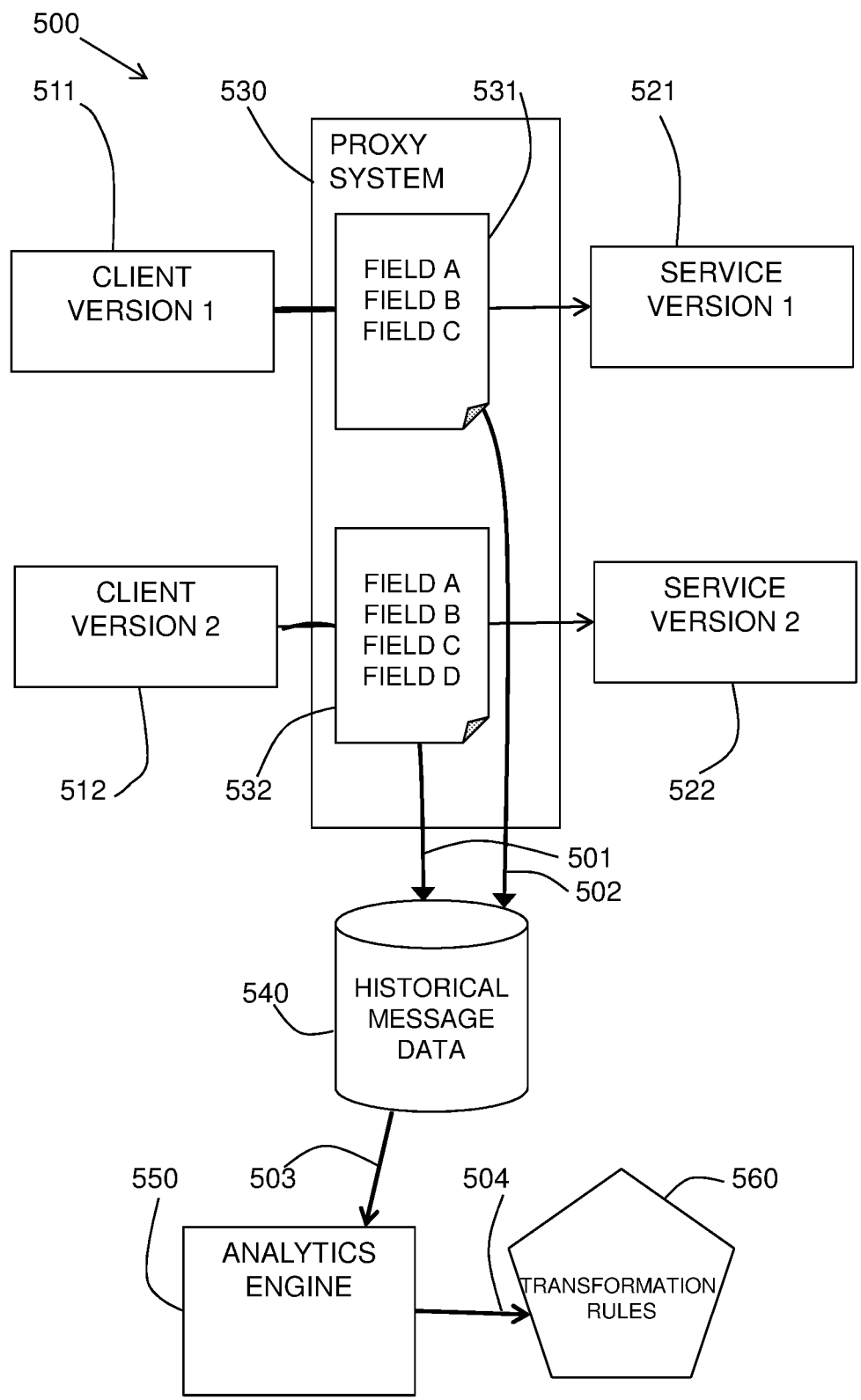
FIG. 5A is a block diagram of an example embodiment of a system in accordance with the present invention illustrating a flow in accordance with a first aspect.
Figure 5B:
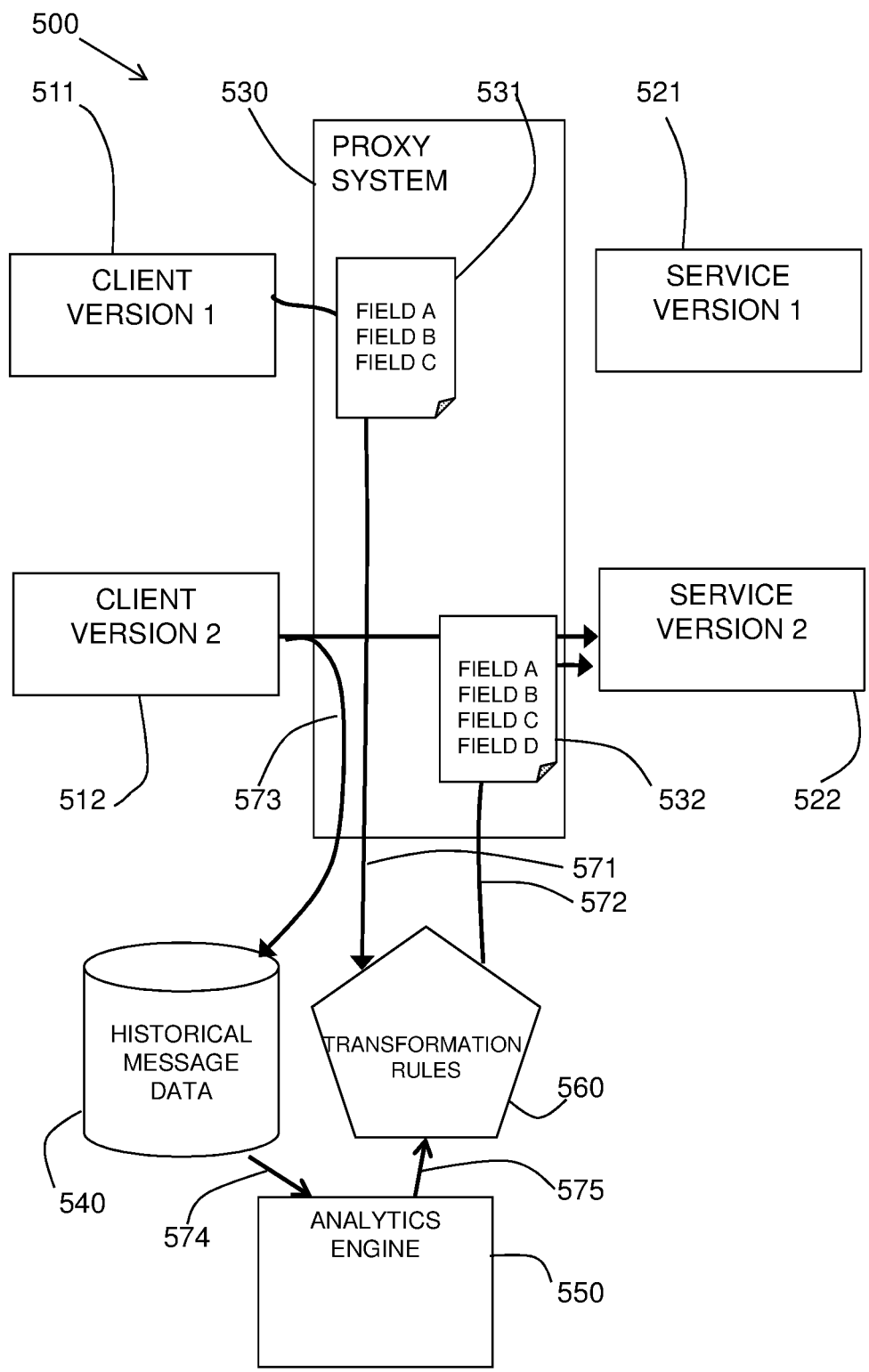
FIG. 5B is a block diagram of an example embodiment of a system in accordance with the present invention illustrating a flow in accordance with a second aspect.

Referring to FIG. 5A and FIG. 5B, an embodiment of the described system 500 is shown with a flow illustrated in each figure of an aspect of the described method.

FIGS. 5A and 5B show a first client version 511 which sends a first message 531 to a first service version 521. The first message 531 may be of a message format suitable for the first service version 521. A second client version 512 sends a second message 532 to a second service version 522. The second message 532 may be of a message format suitable for the second service version 522. This is similar to the scenario illustrated in FIG. 1.

Additional versions of a service may be supported as well as additional services having multiple versions. However, for simplicity of illustration two service versions are shown.

In the described system, a proxy system 530 is provided which may also be referred to as a gateway system.

In a data collection phase shown in FIG. 5A, the proxy system 530 may collect 501, 502 message data from messages 531, 532 and store it in a historical message data store 540.

The described system may also include an analytics engine 550 which may interrogate 503 the collected message data in the historical message data store 540 to generate 504 transformation rules 560.

In a transformation phase shown in FIG. 5B, the proxy system 530 may identify and intercept 571 a message 531 destined for the first service version 521 from the first client version 511 and may apply the transformation rules 560 to the message 531. The transformation rules 560 may convert the message 531 from a format for the first service version 521 to a format for the second service version 522 and the converted message 532 may be sent 572 to the second service version 522.

Messages 532 from the second client version 512 may continue to be collected by the proxy system 530 and sent 573 to the historical message data store 540 for analysis 574 by the analytics engine 550 which may update 575 the transformation rules 560.

Figure 5C:
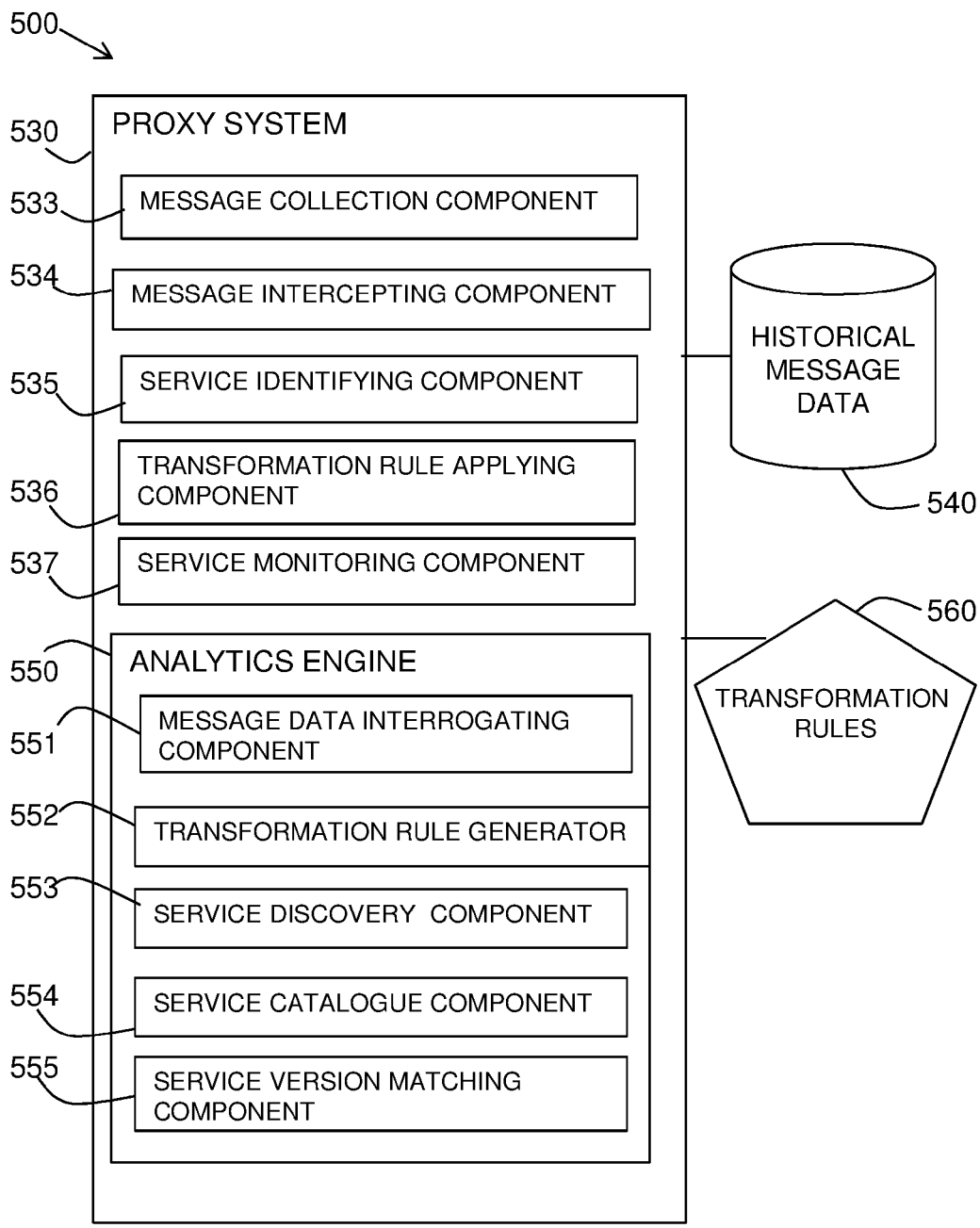
FIG. 5C is a block diagram of an embodiment of a system in accordance with the present invention.

Referring to FIG. 5C, further components of the system 500 are shown. FIG. 5C shows a proxy system 530 and an analytics engine 550 for processing and analyzing data. The analytics engine 550 may be incorporated into the proxy system 530 or may be provided as a separate component. In addition, the system 500 includes a historical message data store 540 and transformation rules 560 which may also be local or remote to the proxy system 530 and analytics engine 550.

The proxy system 530 may include a message collection component 533 for collecting message data in the data collection phase. The collected message data may be sent by the message collection component 533 to a historical message data store 540.

A message data interrogating component 551 of the analytics engine 550 may interrogate the collected message data to infer relationships between different messages destined for different versions of a service. A transformation rule generator 552 may generate transformation rules 560 based on the inferred relationships.

The proxy system 530 may include components used in the transformation phase of: a message intercepting component 534 for intercepting a message, a service identifying component 535 to identify the service version to which the message relates, and a transformation rule applying component 536 for applying the transformation rules 560 to the intercepted message.

The proxy system 530 may include further components for use in the service version matching phase of: a service monitoring component 537 for monitoring messages to discover service versions available. This may work in conjunction with a service discovery component 553 of the analytics engine 550. The service discovery component 553 may use a service catalogue component 554 to catalogue the service versions. A service version matching component 555 may be provided to match a newly monitored service version to earlier service versions.

Figure 6:
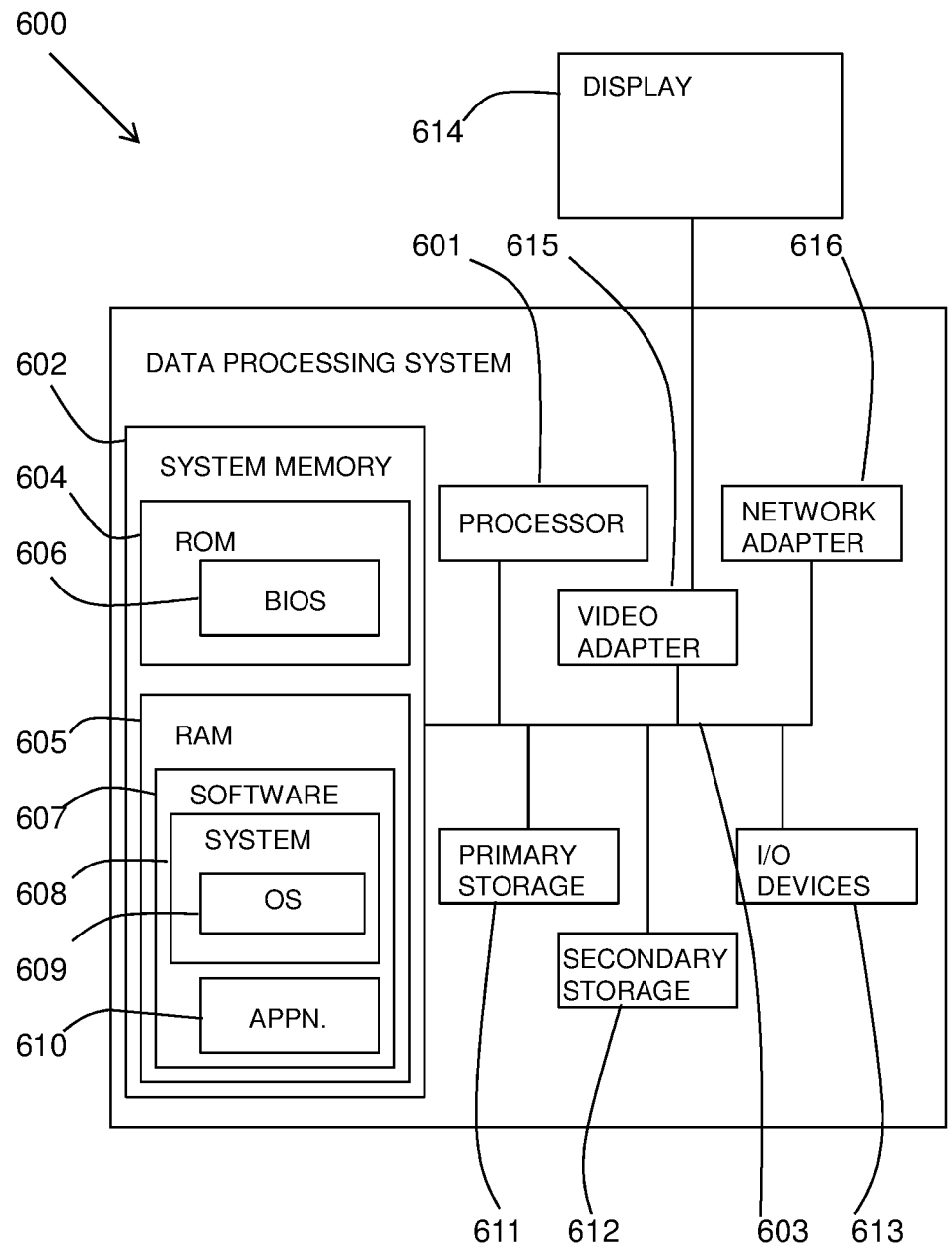
FIG. 6 is a block diagram of an embodiment of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608, which includes operating system software 609, and software applications 610.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

Thereby as discussed above, the present disclosure provides a method for automatic transformation of messages between service versions, which includes collecting message data of messages sent to two or more versions of a service. The method further includes identifying message data as relating to a version of a service. The method further includes inferring relationships between structure and content of messages sent to different versions of a service, and creating message transformation rules based on the inferred relationships.

The method may include monitoring message traffic to discover available service versions to which messages are sent.

The method may further include cataloging a service version with associated meta-data and/or instance data.

Creating message transformation rules may create transformation rules for transforming a message format for an earlier version of a service to a message format for a later version of the service.

The method may further include: receiving a message for a version of a service; identifying if the message is for an earlier version of a service for which there is a later version of the service; transforming the message using transformation rules for transforming a message format for the earlier version of the service to a message format for the later version of the service; forwarding the transformed message to the later version of the service. The method may include phasing out an earlier version of a service when all messages received for an earlier version of a service are transformed into messages for a later version of the service.

The method may additionally include: identifying a new service version based on monitored message traffic; comparing the new service version with known service versions to match to an earlier version of the service. The method may include flagging a match to an earlier version of the service to an administrator. The method may also include constructing a service version gateway for the matched earlier version of the service.

The present disclosure also provides a system for automatic transformation of messages between service versions, which includes a message collecting component for collecting message data of messages sent to two or more versions of a service. The system further includes a service identifying component for identifying message data as relating to a version of a service. The system further includes a message data interrogating component for inferring relationships between structure and content of messages sent to different versions of a service, and a transformation rule generator for creating message transformation rules based on the inferred relationships.

The system may include a service monitoring component for monitoring message traffic to discover available service versions to which messages are sent.

The system may further include a service catalogue component for cataloging a service version with associated meta-data and/or instance data.

The transformation rule generator for creating message transformation rules may create transformation rules for transforming a message format for an earlier version of a service to a message format for a later version of the service.

The system may further include: a message intercepting component for receiving a message for a version of a service; a service identifying component for identifying if the message is for an earlier version of a service for which there is a later version of the service; a transformation rule applying component for transforming the message using transformation rules for transforming a message format for the earlier version of the service to a message format for the later version of the service and forwarding the transformed message to the later version of the service.

The system may additionally include: a service discovery component for identifying a new service version based on monitored message traffic; a service version matching component for comparing the new service version with known service versions to match to an earlier version of the service.

The present disclosure also provides a computer program product for automatic transformation of messages between service versions, wherein the computer program product comprises a computer-readable storage medium having computer-readable program code embodied therewith. The computer-readable program code is configured to: collect message data of messages sent to two or more versions of a service; identify message data as relating to a version of a service; infer relationships between structure and content of messages sent to different versions of a service; and create message transformation rules based on the inferred relationships.

In one embodiment the present disclosure provides a method substantially as described with reference to the figures.

In one embodiment the present disclosure provides a system substantially as described with reference to the figures.

The described aspects and embodiments of the present disclosure provide the advantage of automating the process of transformation between service versions allowing an older version to be gradually phased out.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A method for automatic transformation of messages between service versions, comprising:
   identifying and collecting message data of messages sent to two or more versions of a service, using a proxy system, and storing the collected message data in a historical message data store using the proxy system;
   transforming a message of the messages using message transformation rules generated based on the collected message data in the historical message data store, the message transformation rules for transforming a message format for an earlier version of the service to a message format for a later version of the service, using the proxy system, the transforming the message being in response to identifying, using the proxy system, the message being for the earlier version of the service and there being the later version of the service;
   forwarding the transformed message to the later version of the service, using the proxy system;
   identifying the message data as relating to a version of a service;
   inferring relationships between structure and content of the messages sent to different versions of a service;
   creating the message transformation rules based on the inferred relationships, the message transformation rules being for transforming the message format for the earlier version of the service to the message format for the later version of the service; and
   receiving the message for the version of the service, using the proxy system.

2. The method as claimed in claim 1, comprising:
   monitoring message traffic to discover available service versions to which messages are sent.

3. The method as claimed in claim 1, comprising:
   cataloging a service version with associated meta-data and/or instance data.

4. The method as claimed in claim 1, comprising:
   phasing out an earlier version of a service when all messages received for the earlier version of the service are transformed into messages for the later version of the service.

5. The method as claimed in claim 1, comprising:
   identifying a new service version based on monitored message traffic; and
   comparing the new service version with known service versions to match to an earlier version of the service.

6. The method as claimed in claim 5, comprising:
   flagging a match to an earlier version of the service to an administrator.

7. The method as claimed in claim 5, comprising:
   constructing a service version gateway for the matched earlier version of the service.

8. A system for automatic transformation of messages between service versions, comprising:
   a computer system including one or more computer processors, one or more computer-readable storage media, and program instructions stored on one or more of the computer-readable storage media for execution by at least one of the one or more processors;
   a service identifying component and a message collecting component for identifying and collecting message data, respectively, of messages sent to two or more versions of a service, using a proxy system, and storing the collected message data in a historical message data store using the proxy system;
   a transformation rule generator for transforming a message of the messages using message transformation rules generated based on the collected message data in the historical message data store, the message transformation rules for transforming a message format for an earlier version of the service to a message format for a later version of the service, using the proxy system, the transforming the message being in response to identifying, using the proxy system, the message being for the earlier version of the service and there being the later version of the service, and the transformed message being forwardable to the later version of the service, using the proxy system;

wherein the service identifying component identifies the message data as relating to a version of a service; and the system further comprising:

a message data interrogating component for inferring relationships between structure and content of the messages sent to different versions of a service;

the transformation rule generator creating the message transformation rules based on the inferred relationships;

the proxy system including a message intercepting component for receiving the message for the version of the service, using the proxy system; and the proxy system including a transformation rule applying component for transforming the message format for the earlier version of the service to the message format for the later version of the service.

9. The system as claimed in claim 8, comprising:
a service monitoring component for monitoring message traffic to discover available service versions to which messages are sent.

10. The system as claimed in claim 8, comprising:
a service catalogue component for cataloging a service version with associated meta-data and/or instance data.

11. The system as claimed in claim 8, comprising:
a service discovery component for identifying a new service version based on monitored message traffic; and
a service version matching component for comparing the new service version with known service versions to match to an earlier version of the service.

12. A computer program product for automatic transformation of messages between service versions, the computer program product comprising a computer-readable storage medium having computer-readable program code embodied therewith, the computer-readable program code executable by a computer to perform a method comprising:
identifying and collecting message data of messages sent to two or more versions of a service, using a proxy system, and storing the collected message data in a historical message data store using the proxy system;

transforming a message of the messages using message transformation rules generated based on the collected message data in the historical message data store, the message transformation rules for transforming a message format for an earlier version of the service to a message format for a later version of the service, using the proxy system, the transforming the message being in response to identifying, using the proxy system, the message being for the earlier version of the service and there being the later version of the service;

forwarding the transformed message to the later version of the service, using the proxy system:, identifying the message data as relating to a version of a service;

inferring relationships between structure and content of the messages sent to different versions of a service;

creating the message transformation rules based on the inferred relationships, the message transformation rules being for transforming the message format for the earlier version of the service to the message format for the later version of the service; and receiving the message for the version of the service, using the proxy system.

13. The computer program product as claimed in claim 12, comprising:
monitoring message traffic to discover available service versions to which messages are sent.

14. The computer program product as claimed in claim 12, comprising:
cataloging a service version with associated meta-data and/or instance data.

15. The computer program product as claimed in claim 12, comprising:
phasing out an earlier version of a service when all messages received for the earlier version of the service are transformed into messages for the later version of the service.

16. The computer program product as claimed in claim 12, comprising:
identifying a new service version based on monitored message traffic; and
comparing the new service version with known service versions to match to an earlier version of the service.

17. The computer program product as claimed in claim 16, comprising:
flagging a match to an earlier version of the service to an administrator.

* * * * *